3,412,081
CHROMIUM CONTAINING MIXED REACTIVE
AZO DYESTUFFS
Hans Ackermann, Riehen, Switzerland, assignor to J. R.
Geigy A.G., Basel, Switzerland
No Drawing. Filed Oct. 5, 1964, Ser. No. 401,639
Claims priority, application Switzerland, Oct. 7, 1963,
12,301/63
7 Claims. (Cl. 260—145)

ABSTRACT OF THE DISCLOSURE

A complex chromium compound of the formula

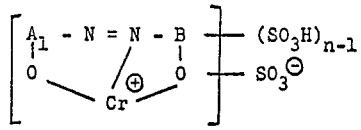

wherein $A_1$ is a phenyl or a naphthyl group with no reactive substituents, B is a phenyl or a naphthyl or a pyrazolyl group with no reactive substituents, each —O— is ortho to —N=N—, and $n$ is at most 3, is reacted with a metallizable disazo dyestuff of the formula

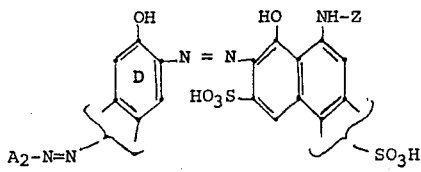

wherein $A_2$ is a sulfonated phenyl or a sulfonated naphthyl group with no reactive substituents and no further ionogenic substituents, Z is a group containing a substituent which can split off as anion, and D can also contain lower alkyl or lower alkoxy, to form the chromium-containing reactive azo dyestuff of the formula

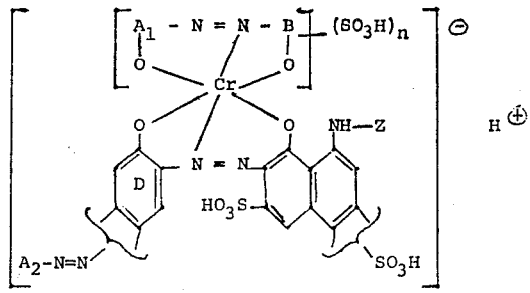

which is useful in dyeing a wide variety of fibers. Since the dyeings are very deep, the new dyes are well suited to attain full black shades.

---

The present invention concerns new chromium containing reactive dyestuffs, processes for the production thereof, their use for the dyeing of cellulose and polyamide material, as well as, as industrial products, the material dyed with the aid of these dyestuffs.

It has now been found that valuable chromium containing reactive dyestuffs are obtained by reacting a complex chromium compound of Formula I

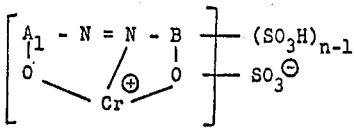

wherein:

$A_1$ represents a radical of the benzene or naphthalene series containing no reactive groups, B represents a radical of the benzene, naphthalene or pyrazole series containing no reactive groups, each of $A_1$ and B containing the oxygen —O— in o-position to the azo bond, and $n$ represents a positive whole number of at most 3, with a metallisable disazo dyestuff of Formula II

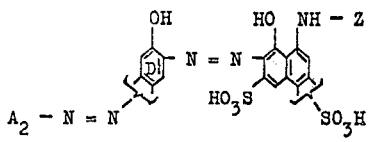

II wherein:

$A_2$ represents a sulphonated radical of the benzene or naphthalene series containing no reactive groups, which radical contains no other ionogenic substituents apart from sulphonic acid groups, Z represents a group which contains at least one substituent which can be split off as anion, and the benzene ring D can also contain lower alkyl and alkoxy groups to form a compound of Formula III

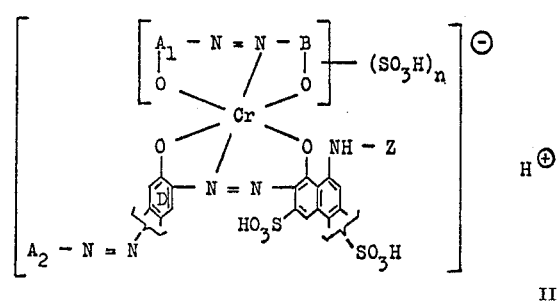

III wherein $A_1$, B and $n$ have the meanings given in Formula I, and $A_2$, Z and D have the meanings given in Formula II.

If $A_1$ and B represent a radical of the naphthalene series then this is bound either in 1-position to the azo group and in 2-position to —O— or vice versa.

If B is a radical of the pyrazole series then it is the radical of a 1-aryl-, in particular 1-phenyl-3-methyl-pyrazole bound in the 4-position to the azo group and in 5-position to —O—.

If $A_2$ is a radical of the naphthalene series, this can be a 1- as well as a 2-naphthyl radical. Preferably $A_2$ is a sulphonated radical of the benzene series containing no reactive groups, which radical contains no other ionogenic substituents apart from sulphonic acid groups.

The aromatic rings of B and $A_2$ can contain the substituents usual in azo dyestuffs as defined, for example lower alkyl groups such as the methyl or ethyl group, lower alkoxy groups such as the methoxy or ethoxy group, halogens such as chlorine or bromine, sulphonic acid amide groups, lower alkylsulphonyl groups or the nitro group. The aromatic ring of $A_1$ preferably contains a sulphonic acid group and/or a nitro group.

In the benzene ring D, the radical $A_2$—N=N— preferably is in the p-position to the hydroxyl group or to the oxygen atom —O—; otherwise the benzene ring D is preferably not further substituted.

As substituents which can be split off as anion, the reactive group Z contains mainly mobile halogen atoms, preferably chlorine, but also bromine; or also sulphonic acid groups. The mobility of these atoms is due to the presence of tertiary ring nitrogen atoms in heterocycles of aromatic character, preferably 6-membered heterocycles having at least two tertiary ring nitrogen atoms.

Therefore Z is the radical of a cyclic imide halide of carbonic acid, in particular a triazinyl radical containing at least one mobile halogen atom, e.g. a chloro- or bromo-s-triazinyl radical which can contain as further substituents halogen, the primary or secondary amino group, an alkoxy, alkylthio, phenoxy or phenylthio group, or an optionally condensed diazinyl radical containing at least one mobile halogen atom which diazinyl radical is bound at a ring carbon atom preferably directly or by way of a —CO-linkage, to the —NH-group, e.g. a dichloro, dibromo, trichloro or tribromo pyrimidyl radical, the radical of the 2,4-dichloropyrimidine-5- or -6-carboxylic acid or of the 2,3-dichloroquinoxaline-6-carboxylic acid; in particular Z is the trichloro pyrimidyl radical.

The starting materials of Formulae I and II are known or can be produced by known methods. Thus, the chromium complexes of Formula I are obtained, for example, by reacting an agent giving off chromium with a monoazo dyestuff of Formula V

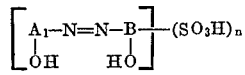

(V)

in an acid medium. Azo dyestuffs of Formula II are obtained, for example, by coupling a diazotised aminoazo dyestuff of Formula VI

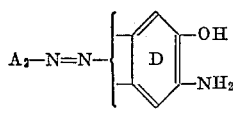

(VI)

with 1-amino-8-hydroxy-3,6- or -4,6-disulphonic acid in an alkaline medium to form the aminodisazo dyestuff of Formula VII

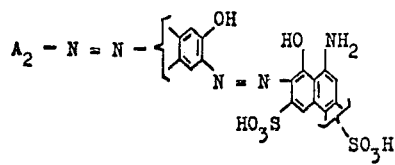

(VII)

and reacting the latter with an acylating agent introducing the radical Z. The halides of the carboxylic acids mentioned in the discussion of Z, mainly halogen triazines and diazines having more than one mobile halogen atom, in particular tetrachloropyrimidine are used as agents which introduce the radical Z.

The components of Formulae I and II are preferably reacted in aqueous solution at a pH of about 4 to 8 and at a raised temperature of about 70–100° C. The end product of Formula III obtained can be salted out in some cases; generally however, it is necessary to evaporate the aqueous solution to dryness in order to isolate the end product.

A modification of the process for the production of chromium containing reactive dyestuffs according to the invention consists in reacting a chromium complex dyestuff of Formula IV

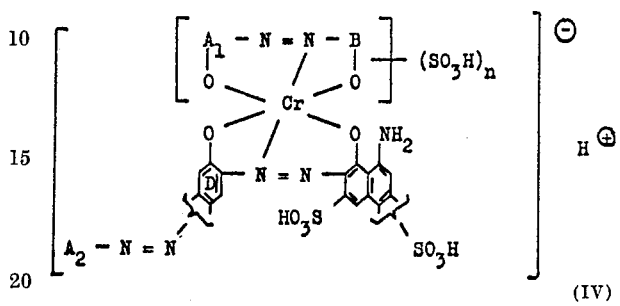

(IV)

wherein $A_1$, $A_2$, B, D and $n$ have the meanings given in Formulae I or II, with an acylating agent introducing the radical Z to form a compound of Formula III, whereby Z has the meaning given in Formula II.

The starting material of Formula IV is obtained, for example, by reacting a complex chromium compound of Formula I with an aminodisazo dyestuff of Formula VII under the conditions described for the first process.

The main acylating agents used to introduce the radical Z are those mentioned in the first process in the description of the production of the starting materials of Formula II.

The reaction of the amino dyestuff of Formula IV with the agent introducing the radical Z is performed in the usual manner, advantageously in aqueous medium, if desired in the presence of inert organic solvents which can easily be removed such as low aliphatic ketones, e.g. acetone, and it is preferably performed in the presence of mineral acid buffering agents such as sodium or potassium carbonate, sodium or potassium hydroxide solution, di- or trisodium phosphate or di- or tri-potassium phosphate, sodium or potassium acetate or tertiary nitrogen bases such as pyridine.

The new chromium containing 2:1 complexes of Formula III are dark powders. In the form of their alkali metal salts they dissolve well in water. They dye cellulose material such as staple fibre, jute, ramie, hemp and, chiefly, cotton, as well as polyamide fibres, e.g. natural polyamide fibres such as wool and silk or synthetic polyamide fibres such as nylon, in brown-black to green-black shades.

These materials are dyed with the dyestuffs according to the invention by known methods.

The cellulose material is impregnated or printed, for example at a low temperature such as 20–50° C., with the optioanally thickened dyestuff solution and the dyeing is then fixed by treatment with acid binding agents. Examples of acid binding agents are sodium carbonate, potassium carbonate, di- and trisodium phosphate, sodium hydroxide solution and, at temperatures of over 50° C., also potassium or sodium bicarbonate. The treatment with these agents can be performed at room temperature or at a raised temperature. Instead of subjecting the impregnated material to an alkaline after-treatment, in many cases the acid binding agent can also be added to the impregnating liquors or printing pastes and then the dyeing is developed by short heating at temperatures over 100° C. to 160° C. or by depositing for a longer time at room temperature.

The new dyestuffs are bound chemically to the fibre by the treatment with acid binding agents. As the non-fixed part of the dyestuff is very easily washed out, the cellulose dyeings have excellent wet fastness properties after soaping.

Natural polyamide fibres are dyed in a hot, weakly acid, e.g. acetic acid, bath in the presence of auxiliaries which improve the eveness of the dyeing such as fatty acid/alkanolamine polycondensation products as well as, optionally, in the presence of salts such as sodium chloride or sulphate. Synthetic polyamide fibres are advantageously dyed in a hot acid bath, then rinsed and aftertreated in a boiling alkaline bath.

The dyestuffs according to the invention produce very deep dyeings and are particularly well suited therefore to attain full black shades.

Further details can be seen from the following examples. Where not otherwise expressely stated, parts are given as parts by weight. The temperatures are in degrees centigrade. The relationship of parts by weight to parts by volume is as that of grams to cubic centimetres.

Example 1

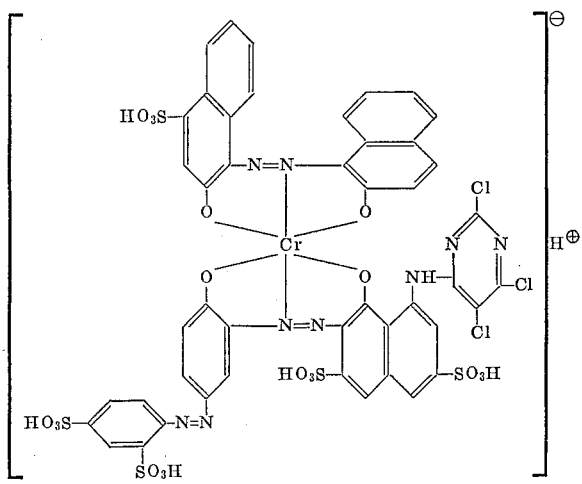

44.4 parts of the chromium complex of the formula

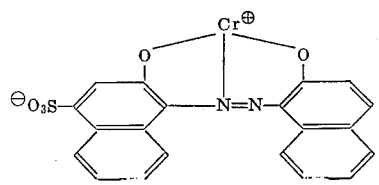

and 88.6 parts of the disazo dyestuff of the formula

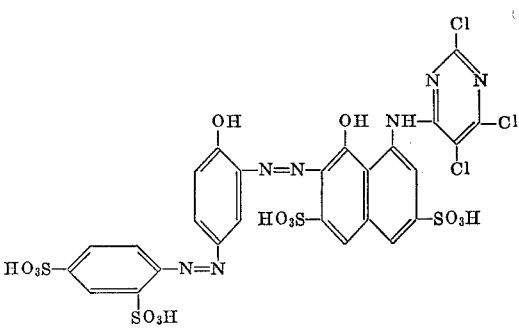

are added to 400 parts of 80° hot water. The pH of the mixture is adjusted to 6–6.5 by the addition of sodium hydroxide solution while stirring and this pH is maintained until the completion of the reaction. The temperature is kept for the whole time at 80–85o. The newly formed dyestuff is completely dissolved. After filtering off slight impurities, the filtrate is concentrated to dryness in vacuo. A dark powder is obtained which easily dissolves in water.

If cotton is foularded at 30° with an 8% solution of this dyestuff which solution also contains 20 parts of sodium carbonate and 200 parts of urea per litre, the impregnated goods are dried, then heated for 5 minutes at 140° and finally soaped at the boil for 30 minutes, then a deep, blueish black dyeing is obtained.

100 parts of wool are introduced at 50° in a dyebath consisting of 4000 parts of water, 6 parts of this dyestuff, 6 parts of 30% acetic acid and 1 part of a condensation product produced by condensing 2 mols of diethanolamine with 1 mol of coconut oil fatty acids, the temperature of the dyebath is then raised within 20 minutes to the boil, and the goods are dyed at the boil for one hour and afterwards rinsed and dried. A deep, blueish black wool dyeing is obtained.

If, instead of the 44.4 or 88.6 parts of the components given in the example, equivalent amounts of the compounds given in columns II and III respectively of the following Table I are used and the procedure described in the example is followed, then dyestuffs having similar properties and the shades given in column IV are obtained.

| I No. | II Chromium Complex | III Diazo Dyestuff | IV Shade |
|---|---|---|---|
| 2 | | | Greenish black. |
| 3 | | | Brown-black. |

| I No. | II Chromium Complex | III Diazo Dyestuff | IV Shade |
|---|---|---|---|
| 4 | | | Black. |
| 5 | | | Green-black. |
| 6 | | | Green black. |
| 7 | | | Black. |
Example 8
119 Parts of the chromium complex of the formula
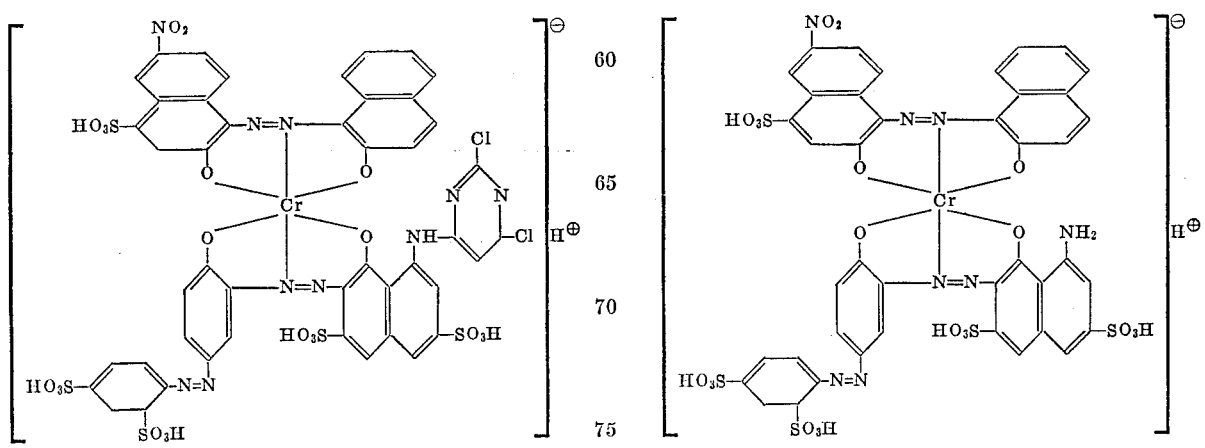

in the form of the sodium salt, are dissolved with a neutral reaction in 700 parts of 80° hot water and the solution is reacted at this temperature with 23 parts of 2,4,5,6-tetrachloropyrimidine. The pH is kept between 5.5 and 6 by the dropwise addition of sodium hydroxide solution. On completion of the reaction, the reaction mixture is cooled to 40°, the reaction solution is clarified by filtration and the filtrate is concentrated to dryness in vacuo. A dark powder is obtained which dissolves very easily in water.

The starting dyestuff for the above process is obtained if the known chromium complex compound of the formula

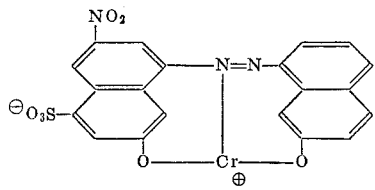

is reacted in a neutral or weakly alkaline solution at 80–90° with equivalent parts of the metallisable disazo dyestuff of the formula

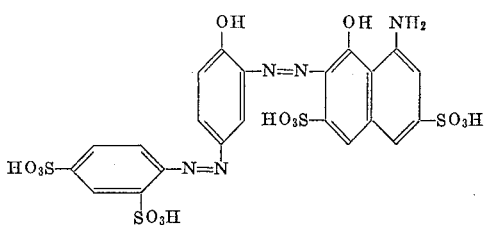

If cotton is pad dyed with an 8% aqueous solution of the dystuff at 50° in the foulard, which solution contains also 5% of urea and 2% of soduim carbonate, dried at 80° and then steamed for 5–10 minutes and soaped at the boil, a deep black dyeing is obtained which is fast to washing.

Dyestuffs having similar properties are obtained if the chromium complexes given in column II of the following Table II are reacted with the acylating agents given in column III at the temperatures shown in column IV.

| I No. | II Chromium Complex | III Acylating Agent | IV Temperature | V Shade |
|---|---|---|---|---|
| 9 | [structure] | [trichloropyrimidine] | 0–5° | Blueish black. |
| 10 | Same as No. 9 above. | [dichloropyrimidine-COCl] | 0–5° | Blueish black. |
| 11 | [structure] | [dichloropyrazine-COCl] | 0–5° | Blueish black. |

| I No. | II Chromium Complex | III Acylating Agent | IV Temperature | V Shade |
|---|---|---|---|---|
| 12 | (structure shown) | (2,4,5-trichloropyrimidine) | 80–90° | Greenish black. |
| 13 | Same as No. 12 above. | (2,4,6-tribromopyrimidine) | 80–90° | Greenish black. |
| 14 | (structure shown) | (2-chloro-4-methoxy pyrimidine type) | 20–30° | Black. |

I claim:
1. A chromium-containing reactive dyestuff of the formula

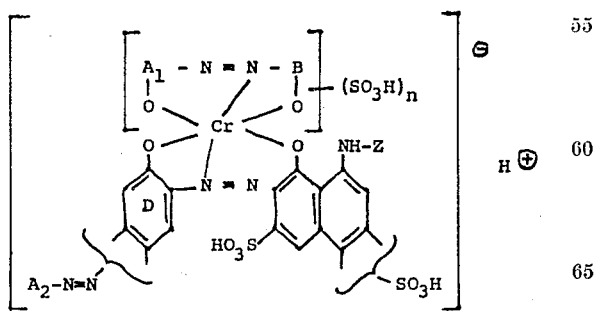

which contains sulfonic acid groups as sole ionogenic substituents in the molecule thereof, and
  wherein $A_1$ represents the radical of an azo dyestuff component of the benzene or naphthalene series (containing no reactive groups),
  B represents the radical of an azo dyestuff component of the benzene, naphthalene or 1-phenyl-3-methyl pyrazole series, each of $A_1$ and B containing the adjacent —O— in o-position to the azo bond between them, the latter being directly connected to a ring carbon atom of B,
  $n$ represents a positive whole number of at most 2,
  $A_2$ represents a mono- or di-sulfonated radical of the benzene or naphthalene series which radical contains sulfonic acid groups as sole ionogenic substituents, and
  Z represents a member selected from the group consisting of 2,4-dichloro-s-triazinyl-, 2-chloro-4-amino-s-triazinyl-, 2-chloro-4-sulfophenylamino-s-triazinyl-, 2-chloro-4-methoxy-s-triazinyl-, 2,4,5-trichloro-pyrimidyl-, 2,4-dichloro-pyrimidyl-, 2,4-dibromo-pyrimidyl- and 2,4-dichloro-pyrimidyl-carbonyl-, and any substituents of ring D other than those shown in the preceding formula being selected from the class consisting of lower alkyl and lower alkoxy.

2. A chromium-containing reactive dyestuff as defined in claim 1, wherein the radical $A_2$—N=N is in the p-position to the oxygen —O— and the benzene ring D contains no further substituents.

3. A chromium-containing reactive dyestuff as defined in claim 1, wherein Z represents the 2,4,5-trichloropyrimidyl radical.

4. A dyestuff the free acid form of which is of the formula
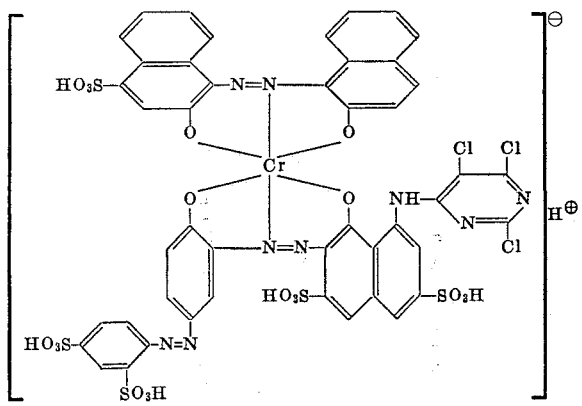
5. A dyestuff the free acid form of which is of the formula
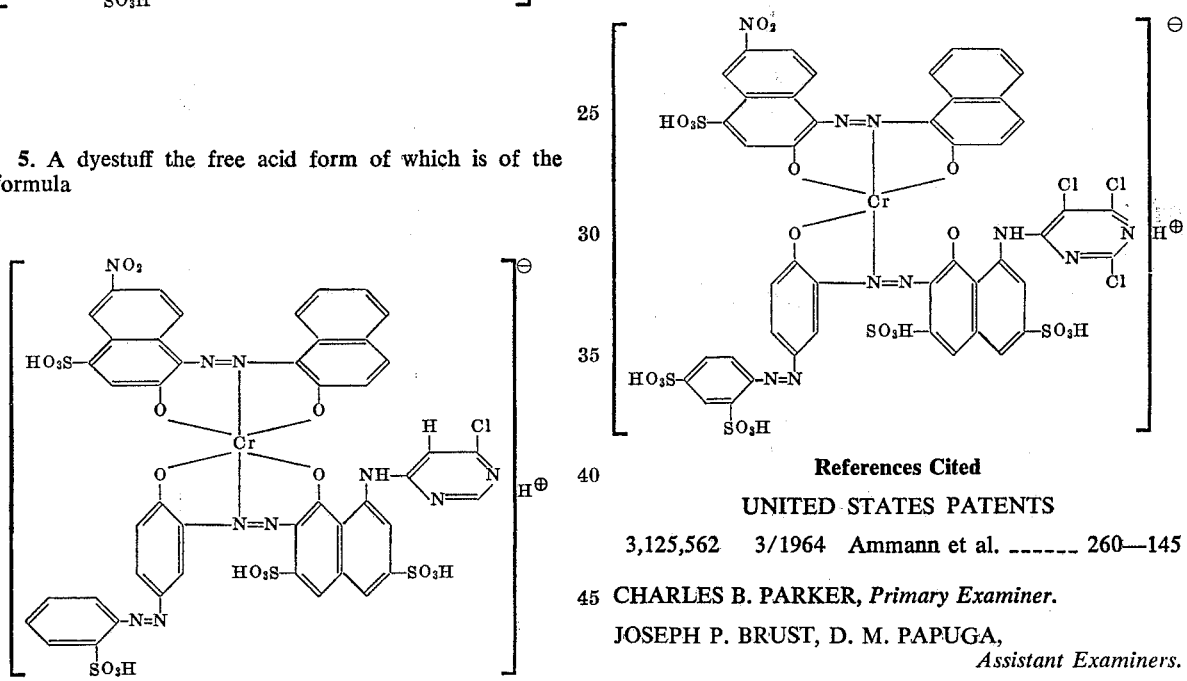
6. A dyestuff the free acid form of which is of the formula
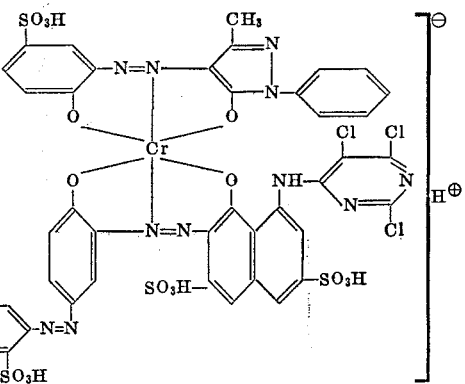
7. A dyestuff the free acid form of which is of the formula
References Cited
UNITED STATES PATENTS
3,125,562   3/1964   Ammann et al. _____ 260—145
CHARLES B. PARKER, *Primary Examiner.*
JOSEPH P. BRUST, D. M. PAPUGA,
*Assistant Examiners.*